(12) United States Patent
Chao (10) Patent No.: US 6,305,799 B1
(45) Date of Patent: Oct. 23, 2001

(54) PEN FOR RECEIVING EYEGLASSES

(76) Inventor: David Chao, 1120 Green Acre Rd., Towson, MD (US) 21204

( * ) Notice: Subject to any disclaimer, the term of this patent is extended or adjusted under 35 U.S.C. 154(b) by 0 days.

(21) Appl. No.: 09/625,748

(22) Filed: Jul. 26, 2000

(51) Int. Cl.[7] .................................................. G02C 1/00
(52) U.S. Cl. ............................................... 351/158; 206/5
(58) Field of Search .......................... 351/158, 63; 206/5

(56) References Cited

U.S. PATENT DOCUMENTS

| 5,430,503 | * | 7/1995 | Colitz, Jr. ........................... 351/158 |
| 5,929,967 | | 7/1999 | Conner ................................ 351/158 |
| 6,145,986 | * | 11/2000 | Conner ................................ 351/158 |

* cited by examiner

*Primary Examiner*—Huy Mai
(74) *Attorney, Agent, or Firm*—Harness, Dickey & Pierce, P.L.C.

(57) ABSTRACT

A pen for receiving a pair of eyeglasses includes a casing and a writing tip. The casing includes an elongated first casing half and a second casing half. The first casing half defines an interior chamber adapted to receive a pair of eyeglasses therein, and has a front end, a rear end, and an opening that is formed between the front and rear ends, and that is adapted to permit movement of the eyeglasses into the interior chamber therethrough. The second casing half has a mounting side mounted pivotally on the first casing half between the front and rear ends, and a free side resting on the first casing half so that the second casing half covers the opening in the first casing half. The free side is rotatable away from the opening so as to be adapted to permit passage of the eyeglasses through the opening, and is retained releaseably on the first casing half. The writing tip is attached to the front end of the first casing half.

8 Claims, 10 Drawing Sheets

PEN FOR RECEIVING EYEGLASSES

BACKGROUND OF THE INVENTION

1. Field of the Invention

The present invention relates to a pen for receiving eyeglasses, more particularly a pen with a lateral opening to permit access to the interior of the pen from a lateral side thereof for easy storage of a pair of eyeglasses therein.

2. Description of the Related Art

Many people wear eyeglasses only on certain occasions. For instance, people suffering from presbyopia usually wear eyeglasses only for reading and close work, such as writing. Manufacturers have therefore developed a type of pen that has a receiving space for storing a pair of eyeglasses.

U.S. Pat. No. 5,929,967 teaches a pen for receiving eyeglasses, which includes a hollow pen barrel having a first open end and a second open end. The first open end is provided with a writing tip unit, while the second open end has a removable cap mounted pivotally thereon to allow access to an interior of the pen barrel for storage of a pair of eyeglasses from the rear end of the pen. Since the eyeglasses are inserted into the pen barrel via the rear end of the pen, the rear end of the pen, as well as relevant portions of the pen barrel, has to have a sufficiently large diameter for passage of the eyeglasses. As such, the design of the shape of the pen is somewhat restricted. Hence, conventional pens for receiving eyeglasses are generally cylindrical or tubular. In addition, mounting of an additional accessory, such as a flashlight, eraser, etc., to the rear end of the pen is not possible.

SUMMARY OF THE INVENTION

Therefore, the main object of the present invention is to provide a pen for receiving eyeglasses to overcome the aforesaid drawbacks.

Accordingly, a pen of the present invention includes a casing and a writing tip. The casing includes an elongated first casing half and a second casing half. The first casing half defines an interior chamber that is adapted to receive a pair of eyeglasses therein, and has a front end, a rear end, and an opening that is formed between the front and rear ends, and that is adapted to permit movement of the eyeglasses into the interior chamber therethrough. The second casing half has a mounting side mounted pivotally on the first casing half between the front and rear ends, and a free side resting on the first casing half so that the second casing half covers the opening in the first casing half. The free side is rotatable away from the opening so as to be adapted to permit passage of the eyeglasses through the opening, and is retained releaseably on the first casing half. The writing tip is attached to the front end of the first casing half.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail, it should be noted that like elements are denoted by the same reference numerals throughout the disclosure.

Referring to FIGS. 1 to 4, the first preferred embodiment of a pen 1 according to the present invention is shown to comprise a casing 10 and a writing tip 41. The casing 10 includes an elongated first casing half 2, and a second casing half 3. The first casing half 2 defines an interior chamber 11 adapted to receive a pair of eyeglasses 12, such as that shown in FIGS. 5A and 5B, and has a front end 21, a rear end 22, and an opening 241 that is formed between the front and rear ends 21, 22, and that is adapted to permit movement of the eyeglasses 12 into the interior chamber 11 therethrough. The first casing half 2 further has a bowl-shaped bottom 23 formed integrally with two curved partitions 231 to confine the eyeglasses 12 therebetween. In addition, the first casing half 2 has an annular top frame 24 which is mounted on the bottom 23 by means of a bolt 25, and which defines the opening 241 therein. A recess 243 is formed in the top frame 24. The bottom 23 is formed with two aligned integral abutment blocks 232, whereas the top frame 24 is formed with two inverted U-shaped integral abutment legs 242 (see FIG. 3). The abutment legs 242 are respectively fixed on the abutment blocks 232 so as to define two aligned pivot holes between the abutment legs 242 and the abutment blocks 232. Furthermore, the bottom 23 of the first casing half 2 has an L-shaped integral abutment plate 234 that is adapted to permit abutment of a rear end of a writing instrument 4 there against. The writing instrument 4 is provided with the above-mentioned writing tip 41 and, in this embodiment, is a ball-point pen. Certainly, it may also be a pencil or a fountain pen A front end notch 233 is formed in the front end 21 of the first casing half 2 to permit extension of the writing tip 41 from the first casing half 2 therethrough. The bottom 23 further has two parallel integral clamping plates 235 that are provided between the abutment plate 234 and the notch 233 for clamping the writing instrument 4 therebetween. The eyeglasses 12 (see FIGS. 5A and 5B) and the writing instrument 4 are disposed on two sides of the partitions 231.

The second casing half 3, in this embodiment, includes a cover plate 31 shaped to complement the opening 241. The cover plate 31 has a mounting side (3M) and a free side (3F). The mounting side (3M) is formed with two aligned integral pivot pins 32 which extend outwardly from two opposite sides thereof, and which extend into the pivot holes between the abutment legs 242 and the abutment blocks 232. As such, the mounting side (3M) is mounted pivotally on the first casing half 2 between the front and rear ends 21, 22. The free side (3F) rests on the first casing half 2 so that the cover plate 31 covers the opening 241 in the first casing half 2. The free side (3F) has a tongue 33 extending integrally therefrom to engage the recess 243 in the top frame 24 such that the free side (3F) can be retained releasably on the top frame 24. The tongue 33 is removable forcibly from the recess 243 such that the free side (3F) is rotatable away from the opening 241 to permit passage of the eyeglasses 12 through the opening 241.

Figure 1:
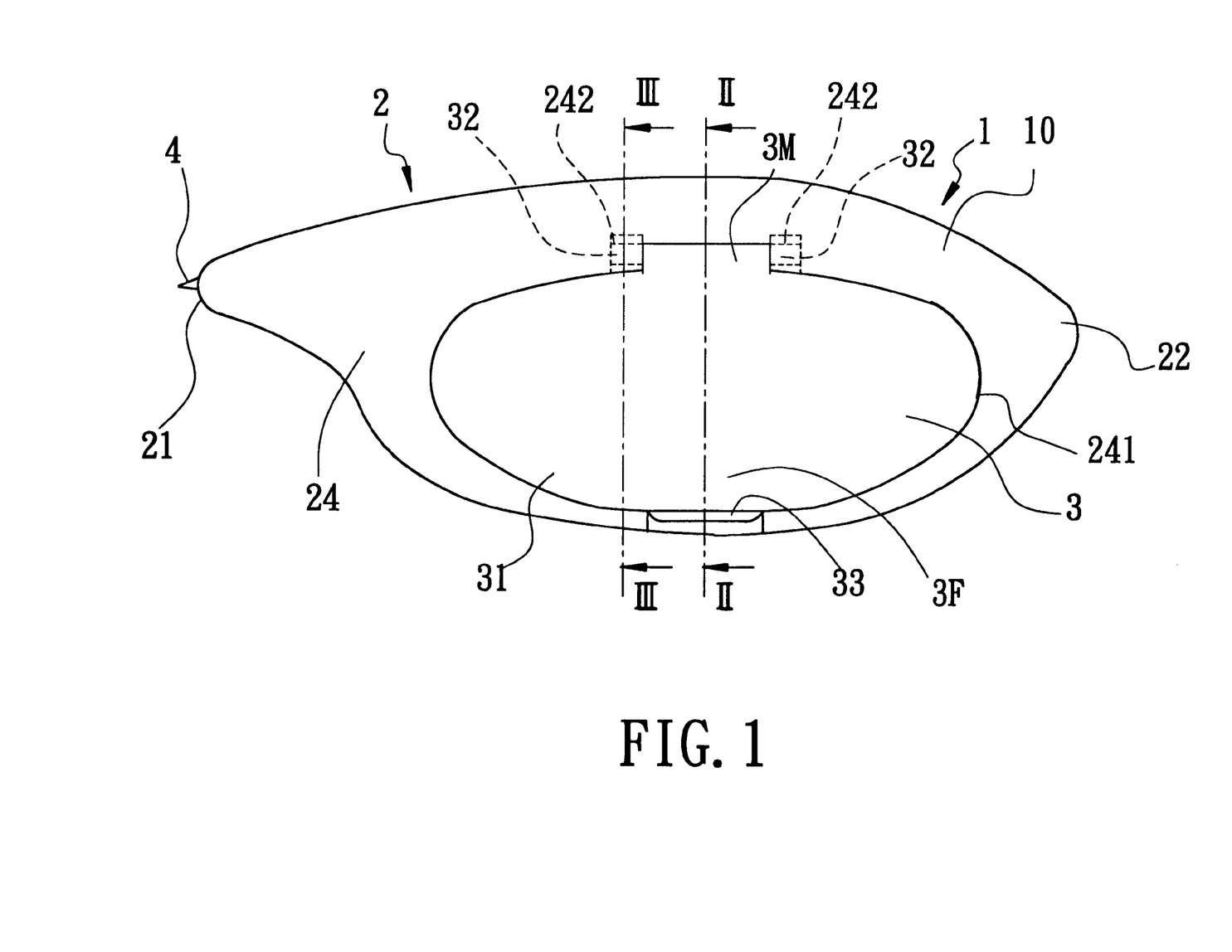
FIG. 1 is a schematic top view of the first preferred embodiment of a pen for receiving eyeglasses according to the invention.
Figure 2:
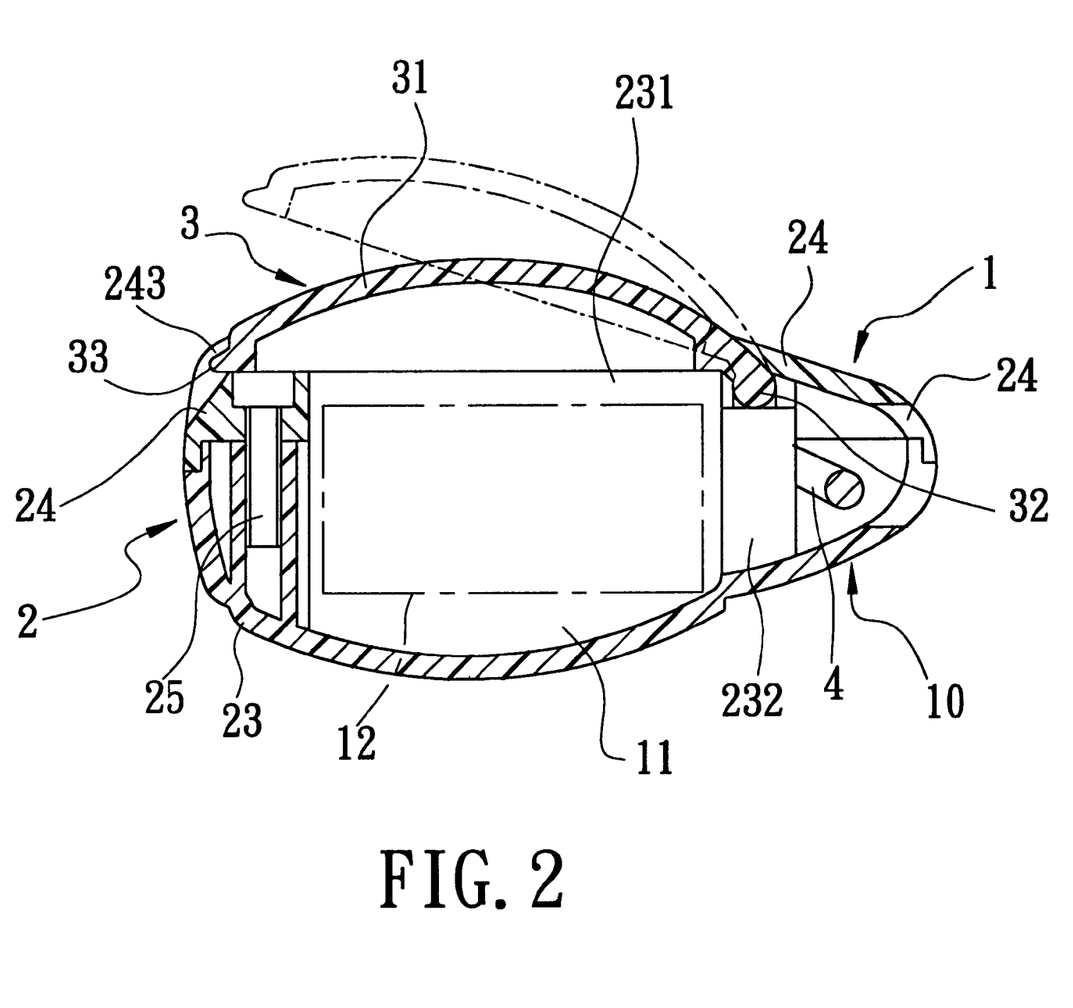
FIG. 2 is a sectional view of the first preferred embodiment, taken along line II—II of FIG. 1.
Figure 3:
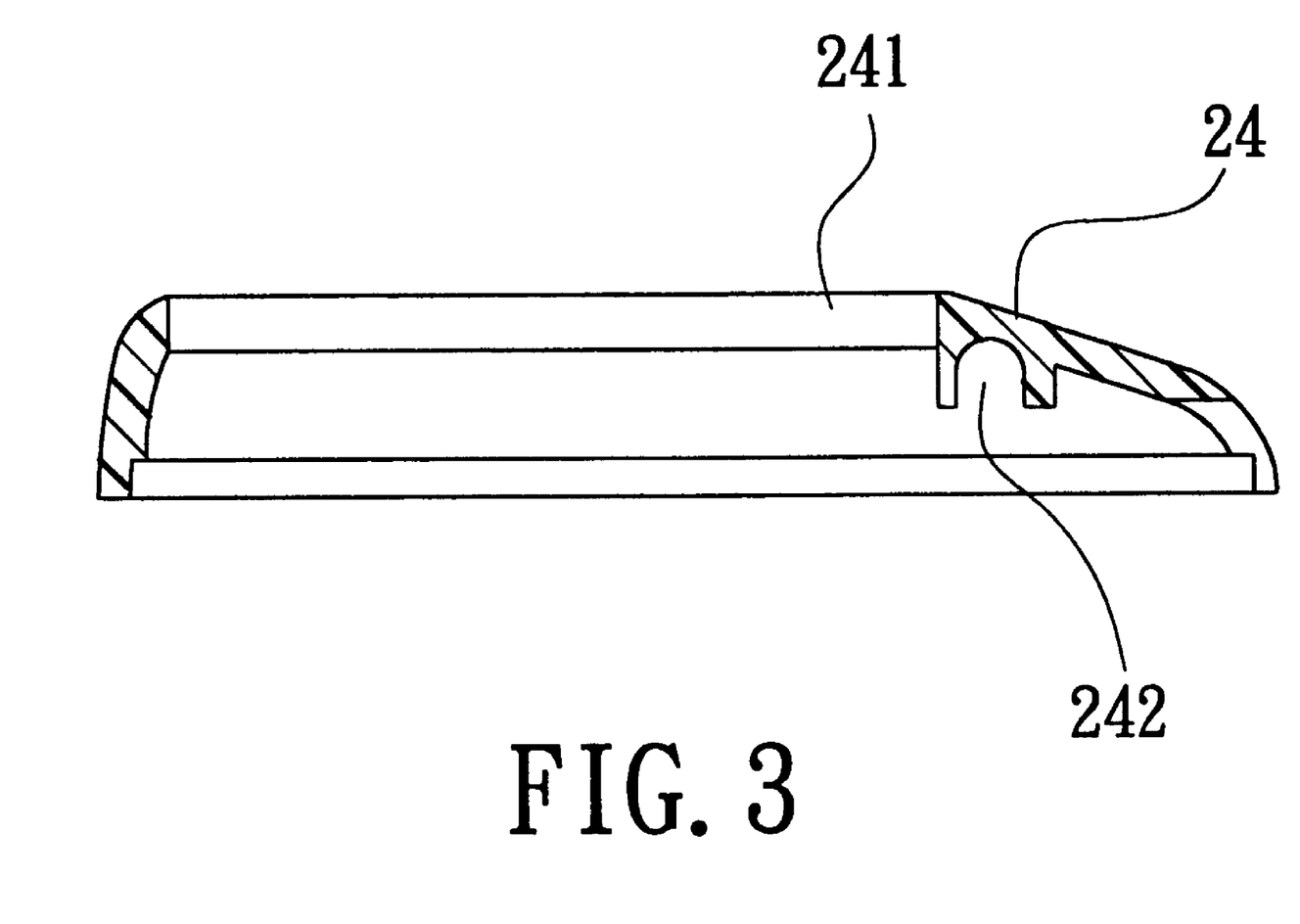
FIG. 3 is a sectional view of the first preferred embodiment, taken along line III—III of FIG. 1.
Figure 4:
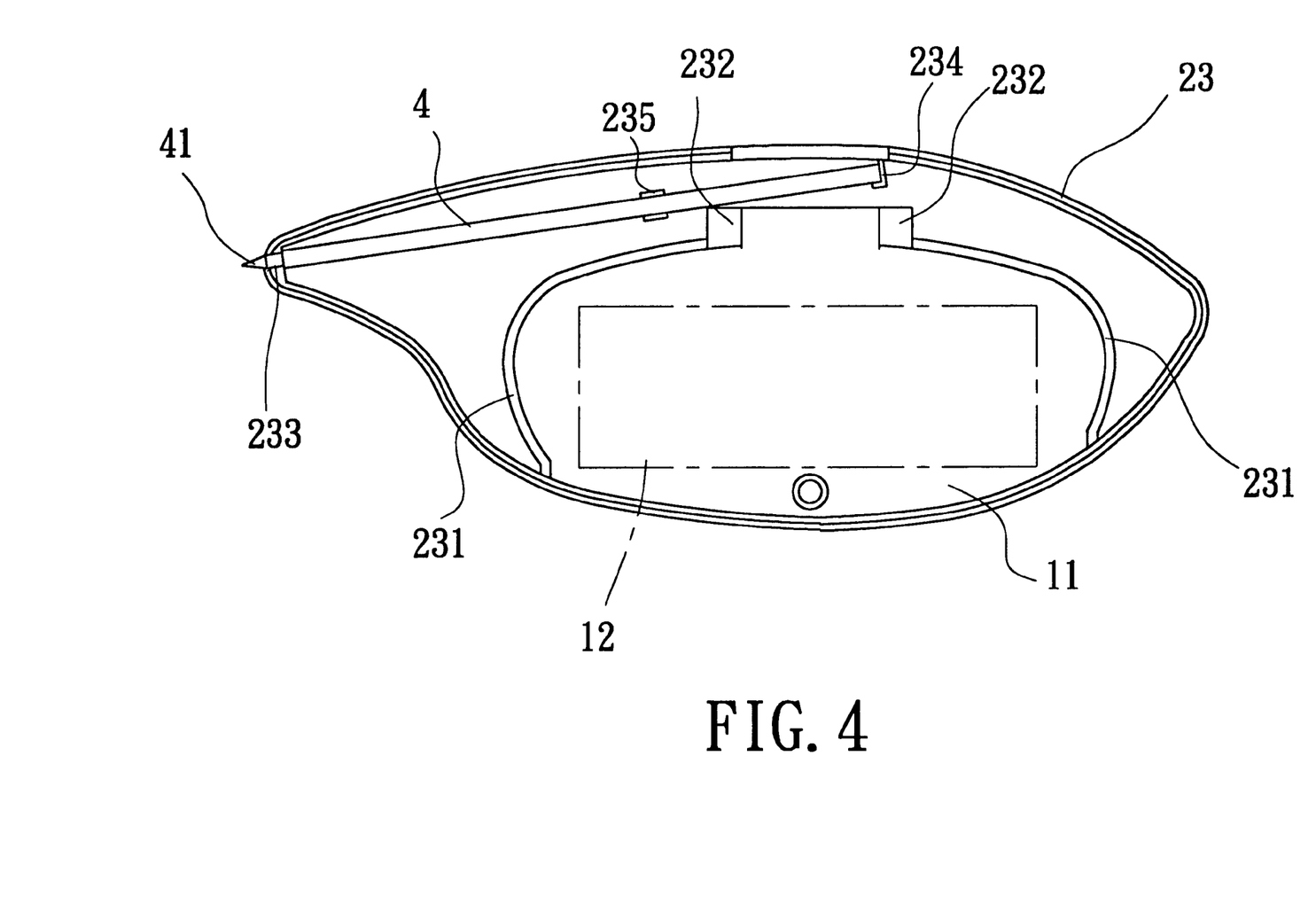
FIG. 4 is a schematic top view of a first casing half of the first preferred embodiment.
Figure 5A:
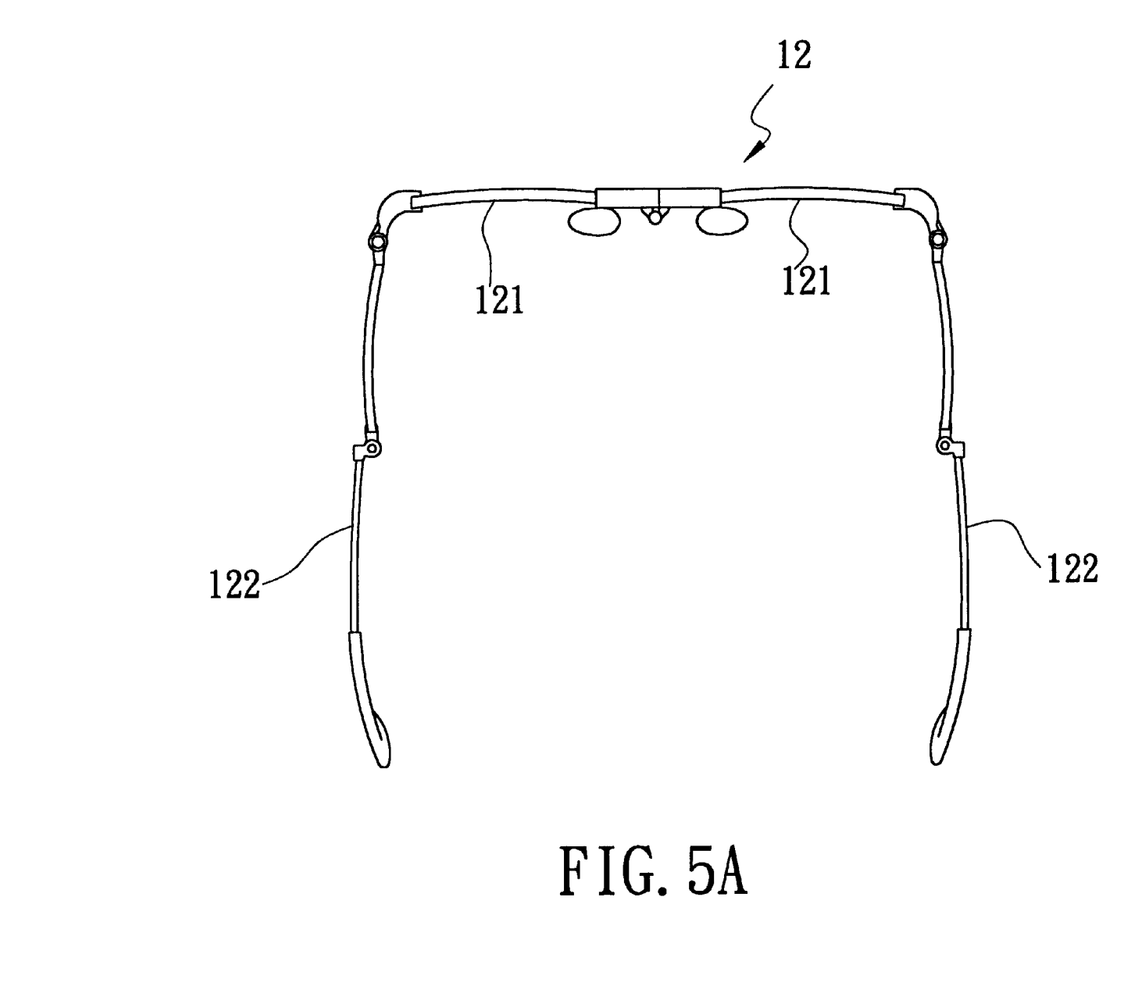
FIGS. 5A and 5B illustrate a pair of foldable eyeglasses in extended and folded states, which can be stowed in the pen of the first preferred embodiment.
Figure 5B:
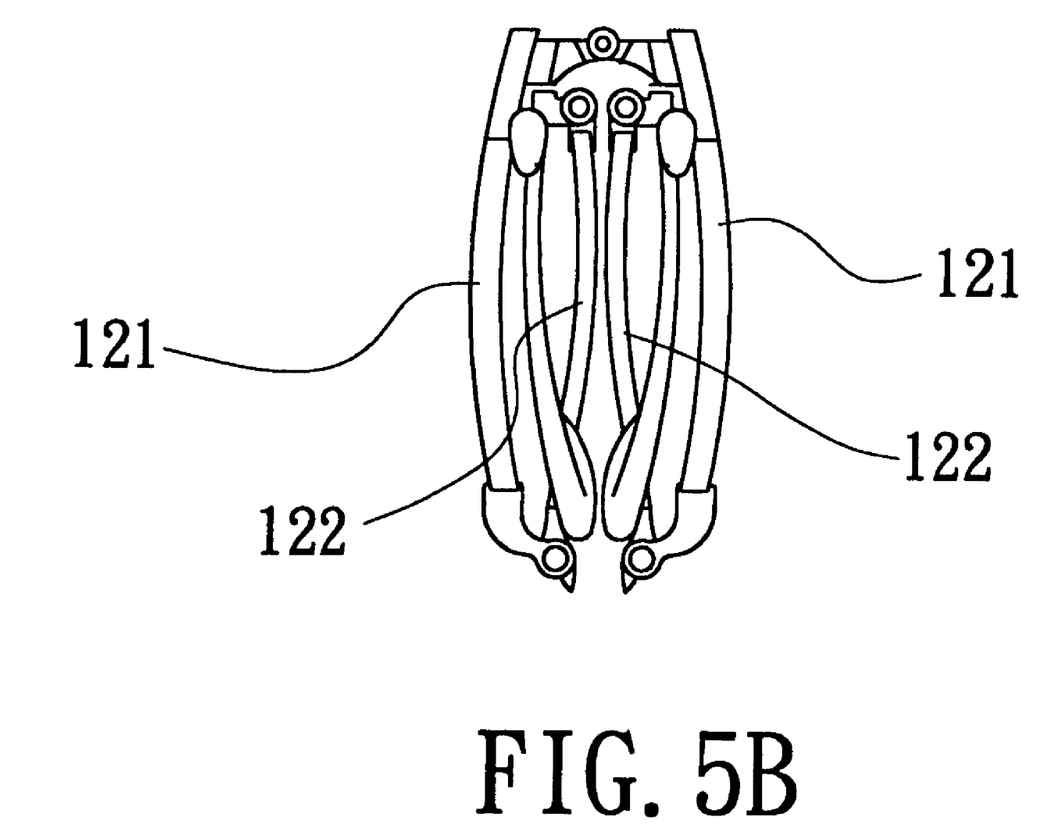

Referring to FIGS. 5A and 5B, the eyeglasses 12 in this embodiment are preferably of a foldable type having a pair of foldable lenses 121 and a pair of foldable temples 122 such that they can be folded compactly for placement in the interior chamber 11 (see FIG. 2).

Figure 6:
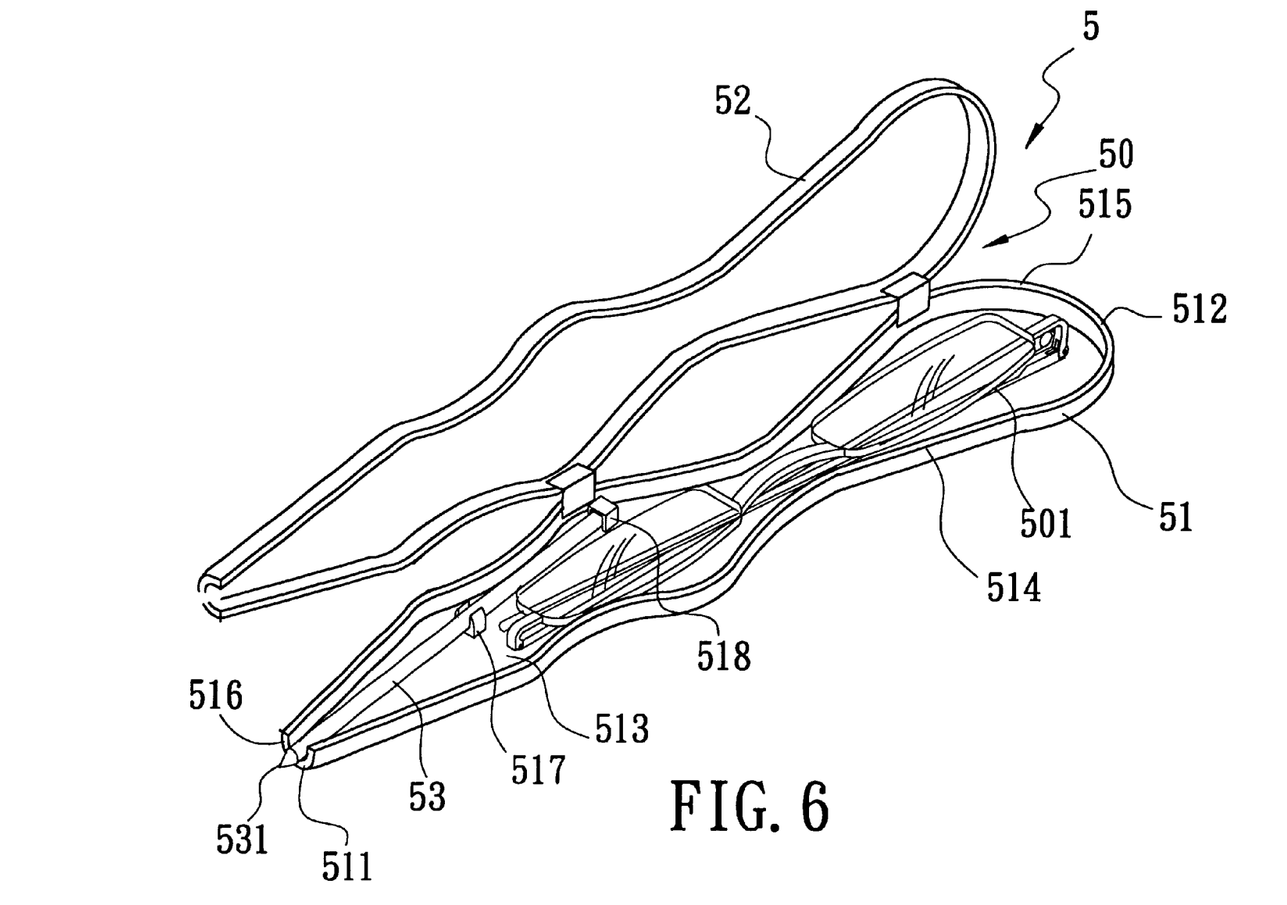
FIG. 6 is a perspective view of the second preferred embodiment of a pen for receiving eyeglasses according to the present invention.

FIG. 6 shows the second preferred embodiment of the present invention. A pen 5 is shown to include an elongated casing 50 having a wavy or gourd-like contour, and a writing instrument 53 with a writing tip 531. In this embodiment, the writing instrument 53 is a ball-point pen. The casing 50 includes symmetrically shaped first and second casing halves 51, 52. The first casing half 51 defines an interior chamber 513 adapted to receive a pair of eyeglasses 501 of a non-foldable type, and has a front end 511, a rear end 512, and an opening 515 formed between the front and rear ends 511, 512 and defined by a peripheral wall 514 to permit access to the interior chamber 513. The front end 511 is formed with a notch 516 for extension of the writing tip 531 therethrough. An abutment plate 518 is provided integrally on a bottom of the first casing half 51 for abutment of a rear end of the writing instrument 53 there against. Two parallel integral clamping plates 517 are disposed between the abutment plate 518 and the notch 516 for clamping the writing instrument 53 therebetween. The second casing half 52 is mounted pivotally to one side of the first casing half 51, and is retained releasably on the other side thereof such that it is rotatable to permit or close access to the opening 515.

Figure 7:
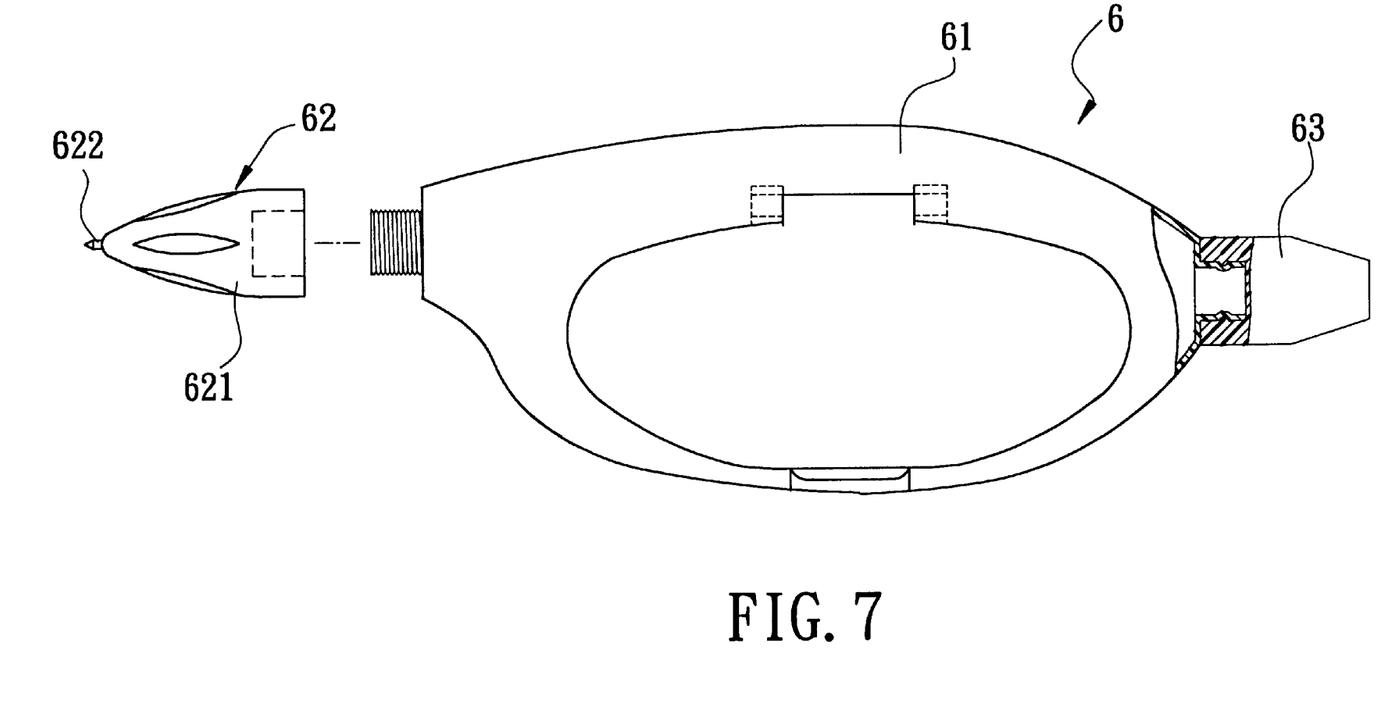
FIG. 7 is a top view of the third preferred embodiment of a pen for receiving eyeglasses according to the present invention.

FIG. 7 shows a pen 6 of the third preferred embodiment of the present invention, which includes a first casing half 61 and a writing instrument 62. This embodiment differs from the first embodiment in that a rear end of the first casing half 61 is provided with a flashlight 63 mounted removably thereon. Besides, the writing tip 622 is mounted in, and extends from a cap 621 that engages threadedly a front end of the first casing half 61.

Figure 8:
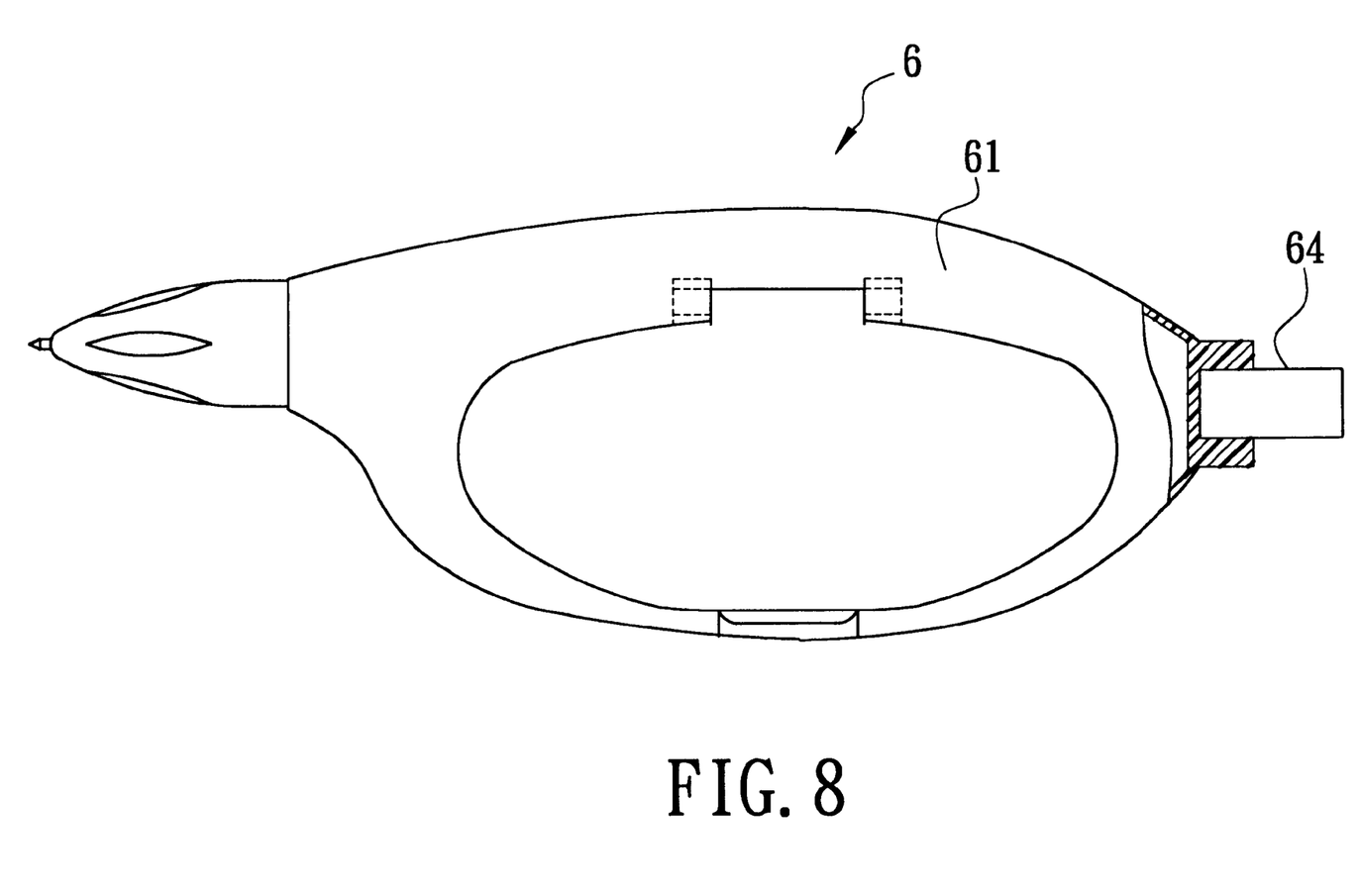
FIG. 8 is a top view of the fourth preferred embodiment of a pen for receiving eyeglasses according to the present invention.

In the fourth preferred embodiment as shown in FIG. 8, the rear end of the first casing half 61 of the pen 6 is provided with a pen-track erasing member 64 mounted removably thereon. The erasing member 64 may be an eraser, or an applicator of a correction fluid holder (not shown).

Figure 9:
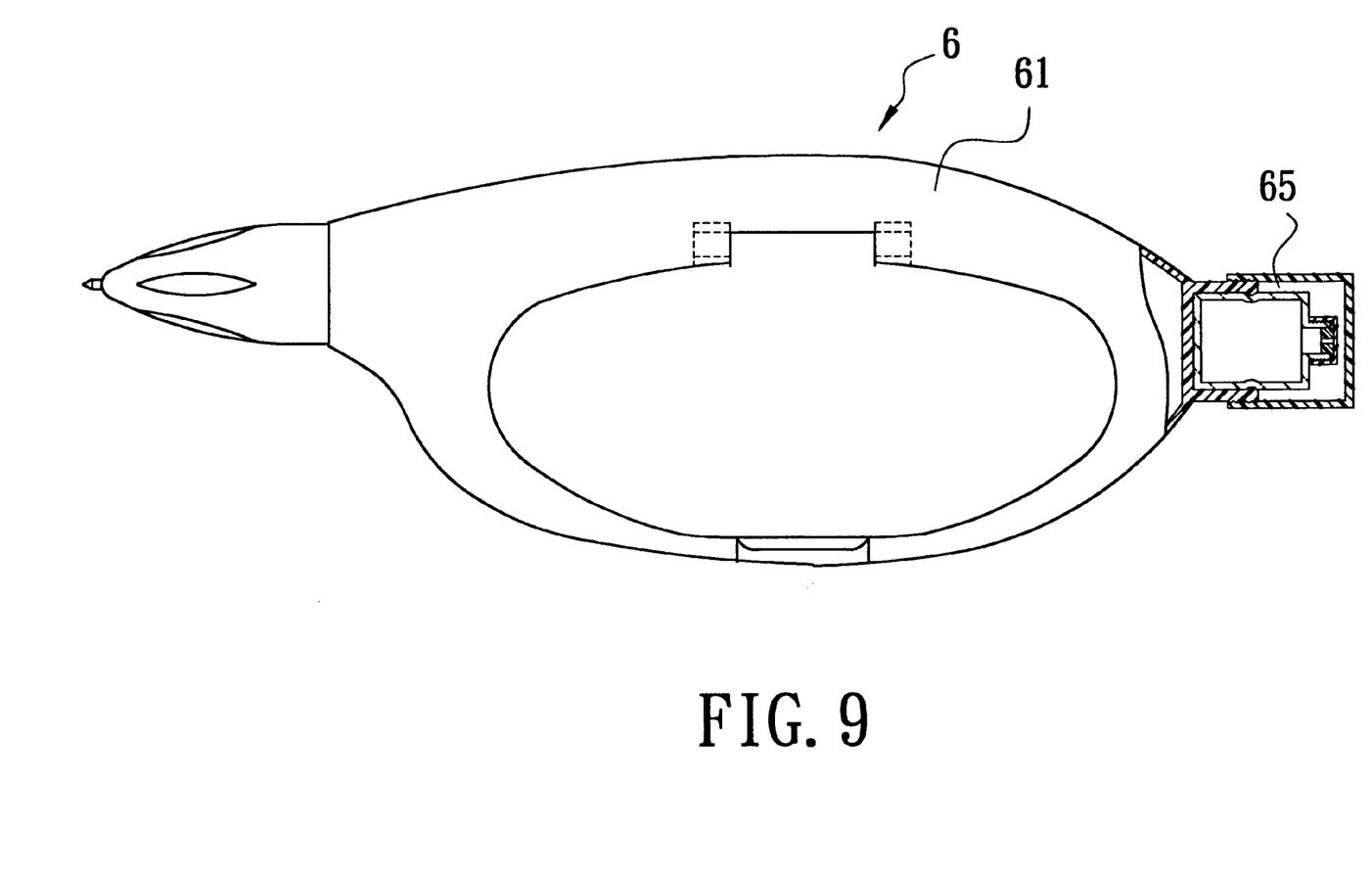
FIG. 9 is a top view of the fifth preferred embodiment of a pen for receiving eyeglasses according to the present invention.

In the fifth preferred embodiment as shown in FIG. 9, the rear end of the first casing half 61 of the pen 6 is provided with a perfume container 65 mounted removably thereon.

From the foregoing, it can be appreciated that since access to the interior of the pen is from a lateral side of the pen, instead of from the rear end, arrangement of an additional functional accessory, such as a flashlight, eraser, etc., at the rear end of the pen is easier in terms of manufacture and assembly. Furthermore, the pen can assume a shape other than the conventional cylindrical shape so as to provide more variety in design choices. For instance, in the second preferred embodiment, the pen 5 has an interesting wavy or gourd-like shape.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:
1. A pen comprising:
  a casing including
    an elongated first casing half which defines an interior chamber that is adapted to receive a pair of eyeglasses therein, and which has a front end, a rear end, and an opening that is formed between said front and rear ends and that is adapted to permit movement of the eyeglasses into said interior chamber therethrough,
    a second casing half having a mounting side which is mounted pivotally on said first casing half between said front and rear ends, and a free side which rests on said first casing half so that said second casing half covers said opening in said first casing half, and which is rotatable away from said opening so as to be adapted to permit passage of the eyeglasses through said opening, and
    means for retaining releaseably said free side of said second casing half on said first casing half; and
  a writing tip attached to said front end of said first casing half.

2. The pen as claimed in claim 1, wherein said first casing half has a bowl-shaped bottom which is formed integrally with two curved partitions, which are adapted to confine the eyeglasses therebetween.

3. The pen as claimed in claim 2, wherein said first casing half further has an annular top frame which is bolted to said bottom and which defines said opening therein, said bottom being formed with two aligned integral abutment blocks, said top frame being formed with two inverted U-shaped integral abutment legs which are fixed on said abutment blocks, respectively, so as to define two aligned pivot holes between said abutment legs and said abutment blocks, said mounting side of said second casing half being formed with two aligned integral pivot pins which extend outwardly from two opposite sides thereof and which extend into said pivot holes that are defined between said abutment legs and said abutment blocks.

4. The pen as claimed in claim 1, wherein said first casing half has an L-shaped integral abutment plate which is adapted to permit abutment of a rear end of a writing instrument thereon that is provided with the writing tip, a front end notch which is adapted to permit extension of the writing tip from said first casing half therethrough, and two parallel integral clamping plates which are formed between said abutment plate and said notch and which are adapted to clamp the writing instrument therebetween.

5. The pen as claimed in claim 4, wherein said means for retaining said free side of said second casing half on said first casing half includes a recess which is formed in said top frame, and a tongue which extends integrally from said free side of said second casing half to engage said recess, said tongue being capable of being removed forcibly from said recess.

6. The pen as claimed in claim 1, wherein said rear end of said first casing half is provided with a flashlight which is mounted removably thereon.

7. The pen as claimed in claim 1, wherein said rear end of said first casing half is provided with a pen-track erasing member which is mounted removably thereon.

8. The pen as claimed in claim 1, wherein said rear end of said first casing half is provided with a perfume container which is mounted removably thereon.

* * * * *